Patented July 20, 1937

2,087,866

UNITED STATES PATENT OFFICE 2,087,866

VAT DYESTUFF PREPARATIONS

Henry J. Weiland, Wilmington, Del., and Otto Stallmann, South Milwaukee, Wis., assignors to E. I. du Pont de Nemours & Company, Wilmington, Del., a corporation of Delaware No Drawing. Application March 17, 1937, Serial No. 131,524

8 Claims. (Cl. 8—6)

This invention relates to the production of new vat dye preparations and more particularly to the preparation of improved vat dye powders suitable for printing and for use in the pigment pad reduction dyeing process. The invention also contemplates the use of new compounds for dispersing finely divided solids generally.

In the printing of textile fibers with vat dyestuffs where the dyestuff is incorporated in the printing pastes either as a powder or in the form of a dye paste, the particles of the dyestuffs themselves must be exceptionally small and well dispersed. A great many difficulties have been experienced in the art of textile printing with vat dyestuffs, many of which are peculiar to the individual colors themselves, although many are experienced generally throughout the class. A number of chemical substances have been added to the printing formulas to overcome the defects which have been experienced and these compounds have been generally referred to as printing assistants. Their functions, however, may differ widely. In some cases these printing assistants are added to enhance the shade and printing strength of the dyestuff. In other cases they are used to increase the penetration of the dye in the fiber, or to prevent coagulation of the dyestuff particles so that uniformly even prints which are free of specks may be obtained.

In the preparation of vat dye powders it has been found necessary to incorporate therein wetting or dispersing agents so that the powder will wet out readily and disperse evenly throughout the aqueous solution or paste in which it may be incorporated. Many of the most efficient dispersing and wetting agents, however, also have the property of foaming in aqueous solutions and are therefore not suitable for this use. One of the most commonly used and most efficient dispersing agents for vat dye pastes and powders is the condensation product of formaldehyde with sulfonated naphthalene (B. P. 7,137 of 1913) or its equivalent, the "Tetralin" sulfonic acid formaldehyde condensation product. The use of these dispersing agents, however, has been restricted to the preparation of dyeing pastes and powders, since they form comparatively insoluble potassium salts and are therefore precipitated from the ordinary printing gums in which there is incorporated a high percentage of either potassium or sodium carbonate.

It is an object of this invention to provide agents which may be used in vat dye powders, which in themselves have dispersing power but also act as anti-coagulants in printing pastes and powders when the same are incorporated in printing pastes in the presence of large amounts of alkali-metal carbonate.

It is a further object of the invention to provide materials which may be used with the condensation product of a formaldehyde and naphthalene sulfonic acid to prevent its precipitation in a high percent alkali-metal carbonate solution, thereby rendering possible the use of this well known and efficient dispersing agent in vat dye printing pastes and powders.

We have found that compounds having the general formula,

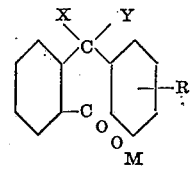

wherein R represents one or more solubilizing groups of the class consisting of $SO_3M$, $OM$, $SM$ and $COOM$, and wherein X stands for hydrogen while Y stands for hydrogen or OH, and where X and Y together stand for oxygen, and M in all cases stands for H, or an alkali-metal, are valuable dispersing agents for vat dye pastes and powders and possess the property of rendering other dispersing agents used in the preparation of dyestuff pastes and powders which are not soluble in concentrated potassium carbonate solutions soluble therein, and therefore useful in the conventional printing pastes which contain large amounts of potassium carbonate, thereby making possible the use of these valuable dispersing agents in vat dye pastes and powders which are suitable for printing.

Among the compounds contemplated under the above formula may be mentioned p-sulfobenzoyl-ortho-benzoic acid, p-sulfobenzyl-ortho-benzoic acid, p-hydroxybenzoyl-ortho-benzoic acid, p-hydroxybenzyl - ortho - benzoic acid, p - hydroxyphenylphthalide, p-mercaptobenzoyl-ortho-benzoic acid, the sodium salt of the sulfo acid of phenylphthalide and the alkali salts of the condensation products of phthalaldehydic acid with cresol, resorcinol, gallic acid, pyrogallol, etc. These compounds have been found to be particularly suitable for use in the preparation of powders which may be employed in the preparation of printing pastes or for use in the pigment pad reduction dyeing process. It will be noted that each of these compounds contains the diphenylmethane linkage, and each contains at least two groups capable of forming alkali-metal salts, one of which is a carboxylic acid group. These compounds can be used in the form of the free acid or as the alkali-metal salt. When used in alkaline preparations they, of course, are converted to the salt and function as such.

It has also been found that in many cases the addition of these compounds to dyestuff pastes which tend to coagulate, due to the physical form of the dyestuff particles present, renders the product suitable for printing purposes, where otherwise there appears to be coagulation on the addition of such dyestuff paste to the printing gum formula.

It will be obvious that these new dispersing agents may be used to disperse any finely divided water insoluble material, and in conjunction with the formaldehyde naphthalenesulfonic acid condensation product particularly when it is to be used in preparations containing a high alkali-metal carbonate content.

The invention therefore contemplates the use of these compounds as dispersing agents, although as more particularly illustrated by the following examples, they are especially useful in the preparation of vat dye powders adapted for use in textile printing.

The following examples are given to more fully illustrate the invention. The parts used are by weight.

*Example 1*

The ability of this class of dispersing or anti-coagulating agents to draw certain insoluble bodies into solution in potassium carbonate solutions of the concentration that is used in the conventional printing gum preparations may be illustrated as follows:

2 parts of a 30% water solution of the sodium salt of the condensation product of formaldehyde with sulfonated naphthalene are added to 20 parts of a 40% solution of potassium carbonate in water, at room temperature. It will be observed that practically all of the dispersion agent is immediately precipitated out of solution as potassium salt, which is practically insoluble in potassium carbonate solutions of this concentration. There are now added 2 parts of the dry, pulverized potassium salt of p-sulfo-ortho-benzoylbenzoic acid. It will be observed that a clear solution is thus obtained free of any suspended insoluble particles.

When 2 parts of the same sodium salt solution of the condensation product of formaldehyde with sulfonated naphthalene are added into 20 parts of a 40% potassium carbonate solution which contains .2 parts of the sulfobenzoyl-ortho-benzoic acid in solution, no precipitation whatsoever occurs, the dispersing agent being kept in solution by the presence of the sulfobenzoyl-ortho-benzoic acid.

Other derivatives of diphenylmethane ortho-carboxylic acids of the general formula given above show the same solubilizing effect.

*Example 2*

100 parts of a pyranthrone dye paste containing 20% color solids are mixed with 50 parts of dextrin and the resulting paste is evaporated to dryness. The residual dry mass is pulverized to a fine powder with 10 parts of the dry sodium salt of p-sulfo-benzoyl-ortho-benzoic acid and enough cane sugar to bring the weight to 100 parts. The resulting dye powder disperses in the usual potassium carbonate printing paste without coagulation and gives prints of excellent brightness and strength, free of any uneven or specky effects.

*Example 3*

To 100 parts of a dimethoxydibenzanthrone color paste containing about 6% color solids are added 40 parts of the disodium salt of p-hydroxyphenylphthalide of the probable formula

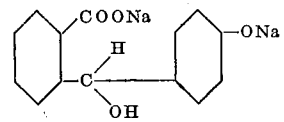

The mass is dried at 100° C. and the dry product is pulverized. The powder thus obtained shows excellent dispersion and wetting out properties when used for dyeing purposes by the regular vat dyeing and especially by pigment pad reduction piece goods dyeing methods. The powder can also be incorporated readily into the conventional types of printing gum preparations, and gives prints free of any "specky" effects. The amount of dispersing agent may be reduced to 20 parts to give a more concentrated powder. Where inert solid diluents such as dextrin or sugar are used, even less of the dispersing agent may be employed.

*Example 4*

To 100 parts of a dichloroindanthrone color paste (20% solids) are added 10 parts of the sodium salt of p-mercapto-benzoyl-ortho-benzoic acid and the paste is evaporated to 100 parts. Unlike the original color paste, this paste shows no coagulation in the conventional printing gum preparations and gives strong and bright shades, free of any "specks", whereas the original material cannot be used for printing.

*Example 5*

To 100 parts of the same dichloroindanthrone paste used in the previous example are added 50 parts of dextrin, 10 parts of the sodium salt of the condensation product of formaldehyde with sulfonated naphthalene and 15 parts of the sodium salt of p-sulfobenzoyl-ortho-benzoic acid. The mass is then evaporated to dryness and the dry residue is pulverized. The powder thus obtained possesses excellent dispersion properties for both dyeing and printing purposes, whereas a similar powder without the sulfobenzoyl-ortho-benzoic acid coagulates in the conventional printing gum preparations.

*Example 6*

To 100 parts of a color paste of 1,2,5,6-bis-dibenzanthraquinonedithiazole (Color Index) containing 10 parts color solids are added 25 parts of the sodium salt of the condensation product of formaldehyde with sulfonated "Tetralin" and 10 parts of the condensation product of formaldehyde with sulfonated naphthalene. The paste thus obtained is milled with the addition of some water to a smooth paste, which is then dried at 100° C., and the dry product is pulverized. While the powder thus obtained is very suitable for dyeing purposes, especially for piece goods dyeings by the "pigment pad reduction method" due to the excellent dispersion properties of the formaldehyde condensation products, this powder cannot be used for printing purposes because it coagulates in the usual printing gum preparations. If, however, the powder is milled thoroughly with 15 parts of the disodium salt of 4'-sulfobenzoyl-ortho-benzoic acid, the resulting powder gives prints of equal strength, brightness and evenness in comparison with a well milled standard dye paste of the same color. At the same time the dispersion and wetting out properties of the powder for dyeing purposes have been further enhanced by the addition of the 4'-sulfobenzoyl-ortho-benzoic acid. The same effect can be obtained if the assistant is incorporated into the color paste before the drying.

*Example 7*

To 100 parts of the color paste used in Example 6 containing 10 parts color solids are added 10 parts of the condensation product of formaldehyde with sulfonated naphthalene and 16 parts of 4'-mercaptobenzoylbenzoic acid (dipotassium salt) and the mass is evaporated to dryness. The powder thus obtained can be printed by the conventional (potassium carbonate) printing methods, free of any coagulation in the printing gum. It is also very suitable for dyeing purposes.

*Example 8*

To 100 parts of a 3,3'-dichloroindanthrone color paste containing 20 parts dichloroindanthrone are added 40 parts of the disodium salt of the sulfo acid of phenylphthalide (obtained by sulfonating phenylphthalide with 10% oleum to a monosulfo acid and converting the same to the sodium salt by the use of sodium hydroxide) of the probable structure

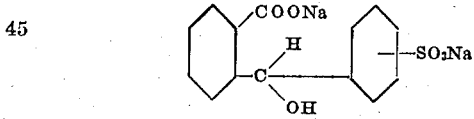

Unlike the original color paste, the paste thus obtained does not coagulate in the conventional printing gum preparations. Likewise a printing powder prepared by drying the paste containing the anti-coagulating agent shows better printing value and furnishes smoother prints than the original paste.

*Example 9*

80 parts of a dimethoxydibenzanthrone color paste containing 15 parts color are milled with 15 parts of the disodium salt of 4'-hydroxybenzyl-ortho-benzoic acid (obtained by reducing 4'-hydroxybenzoyl-ortho-benzoic acid with zinc in dilute ammonia solution) and 20 parts of cane sugar. The mass is then dried and the residue pulverized with the addition of 1 part of a wetting agent, such as the triisopropylnaphthalenesulfonic acid sodium salt. The powder thus obtained furnishes even prints of good shade and strength which are free of specks. The 4'-hydroxybenzyl-ortho-benzoic acid may be replaced with equally good results by an equal amount of the alkali-metal salt of the condensation product of phthalaldehydic acid with cresol. Likewise, the condensation products of the phthalaldehydic acid with resorcinol are found to exert a similar beneficial influence upon the dispersion of these vat dye pastes and powders in the pigment pad dyeing process as well as in the printing.

*Example 10*

To a dimethoxydibenzanthrone color paste containing 5 parts color is added a solution of 15 parts of the sodium salt of the condensation product of phthalaldehydic acid with gallic acid (obtained by stirring equal molecular quantities of the two components in a large amount of 73% sulfuric acid at 20° C., for 24 hours, until the condensation product has separated out of solution as a semi-solid mass, and dissolving the isolated product in 4 mols dilute caustic soda). After the addition of 2 parts sodium bicarbonate the mass is dried on the steam bath and the residual product is pulverized. The printing powder thus obtained shows good dispersion and does not coagulate in the printing gum.

The condensation product of phthalaldehydic acid with pyrogallol, which is obtained in the same manner as the gallic acid derivative described above, also exhibits excellent dispersing power.

While in the above examples comparatively large amounts of the dispersing agents of this invention have been used, it should be noted that a very important embodiment of the invention is seen in the fact that even very small amounts of these products have been found to prevent coagulation in the printing gum, which occasionally occurs even in milled color pastes that normally are suitable for printing.

We claim:

1. An aqueous suspension of a finely divided water insoluble material containing a dispersing agent comprising a compound of the formula

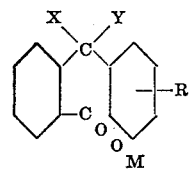

wherein R represents one or more solubilizing groups of the class consisting of $SO_3M$, $OM$, $SM$ and $COOM$, and wherein X stands for hydrogen while Y stands for hydrogen or OH, and where X and Y together stand for oxygen and M in all cases stands for H or an alkali-metal.

2. An aqueous suspension of a finely divided water insoluble material containing a dispersing agent comprising the formaldehyde naphthalenesulfonic acid condensation product, and a compound of the formula

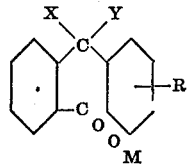

wherein R represents one or more solubilizing groups of the class consisting of $SO_3M$, $OM$, $SM$ and $COOM$, and wherein X stands for hydrogen while Y stands for hydrogen or OH, and where X and Y together stand for oxygen and M in all cases stands for H or an alkali-metal.

3. A readily dispersible vat dyestuff preparation which is adapted for use in printing gum formulas containing high alkali-metal carbonate content which comprises a vat dyestuff in finely divided form and a compound of the formula

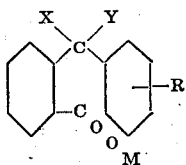

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

4. A vat dye powder containing a dispersing agent comprising a compound of the formula

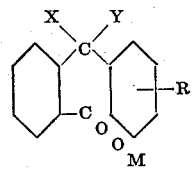

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

5. A vat dye powder containing a dispersing agent comprising the formaldehyde naphthalene-sulfonic acid condensation product and a compound of the formula

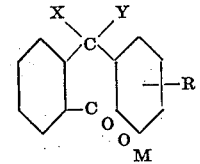

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

6. A vat dye printing paste containing as a dispersing agent a compound of the formula

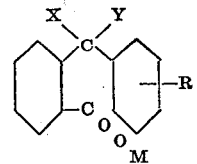

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

7. A dispersing agent comprising a compound of the general formula

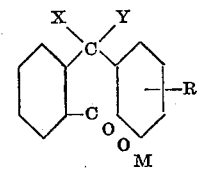

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

8. A dispersing agent comprising the formaldehyde naphthalenesulfonic acid condensation product and a compound of the formula

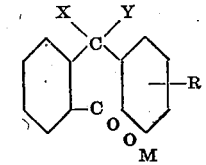

wherein R represents one or more solubilizing groups of the class consisting of SO₃M, OM, SM and COOM, and wherein X stands for hydrogen while Y stands for hydrogen or OH, and where X and Y together stand for oxygen and M in all cases stands for H or an alkali-metal.

HENRY J. WEILAND.
OTTO STALLMANN.